(12) United States Patent
Hsi et al.

(10) Patent No.: US 8,397,008 B2
(45) Date of Patent: Mar. 12, 2013

(54) DOCKING STATION

(75) Inventors: Mao-Shun Hsi, New Taipei (TW);
Yau-Shi Hwang, New Taipei (TW);
Chih-Hao Chang, New Taipei (TW);
Po-Nien Wang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 102 days.

(21) Appl. No.: 13/091,991

(22) Filed: Apr. 21, 2011

(65) Prior Publication Data

US 2012/0047303 A1 Feb. 23, 2012

(30) Foreign Application Priority Data

Aug. 20, 2010 (CN) .......................... 2010 1 0258765

(51) Int. Cl.
*G06F 13/00* (2006.01)
(52) U.S. Cl. .............................. 710/303; 710/313; 710/8

(58) Field of Classification Search .......... 710/300–304, 710/8, 313
See application file for complete search history.

(56) References Cited

U.S. PATENT DOCUMENTS

| 4,932,027 A * | 6/1990 | Scharrer ....................... 370/540 |
| 8,140,733 B2 * | 3/2012 | Wong et al. ................... 710/313 |

* cited by examiner

*Primary Examiner* — Clifford Knoll
(74) *Attorney, Agent, or Firm* — Altis Law Group, Inc.

(57) ABSTRACT

A docking station includes a multiplexer. The multiplexer includes a first input end, a second input end, and an encode system. The encode system is connected to the second input end, and configured to generate an encoding according to a connection status of the second input end. The encode system is configured to generate a first encoding, when a first peripheral device is connected to the second input end, to switch the multiplexer to a first state, in which the second input end is on and the first input end is off. The encode system is further configured to generate a second encoding, when the first peripheral device is not connected to the second input end, to switch the multiplexer to a second state, in which the second input end is off and the first input end is on.

7 Claims, 3 Drawing Sheets

DOCKING STATION

BACKGROUND

1. Technical Field

The present disclosure relates to docking stations.

2. Description of Related Art

The docking stations include a hardware frame and a series of interfaces for connecting a portable computer to peripheral devices. Further, the docking station also can work as a loudspeaker, when a music player is connected to the docking station. However, when a portable computer and the music player are concurrently connected to the docking station, the docking station can not determine which signals to process.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
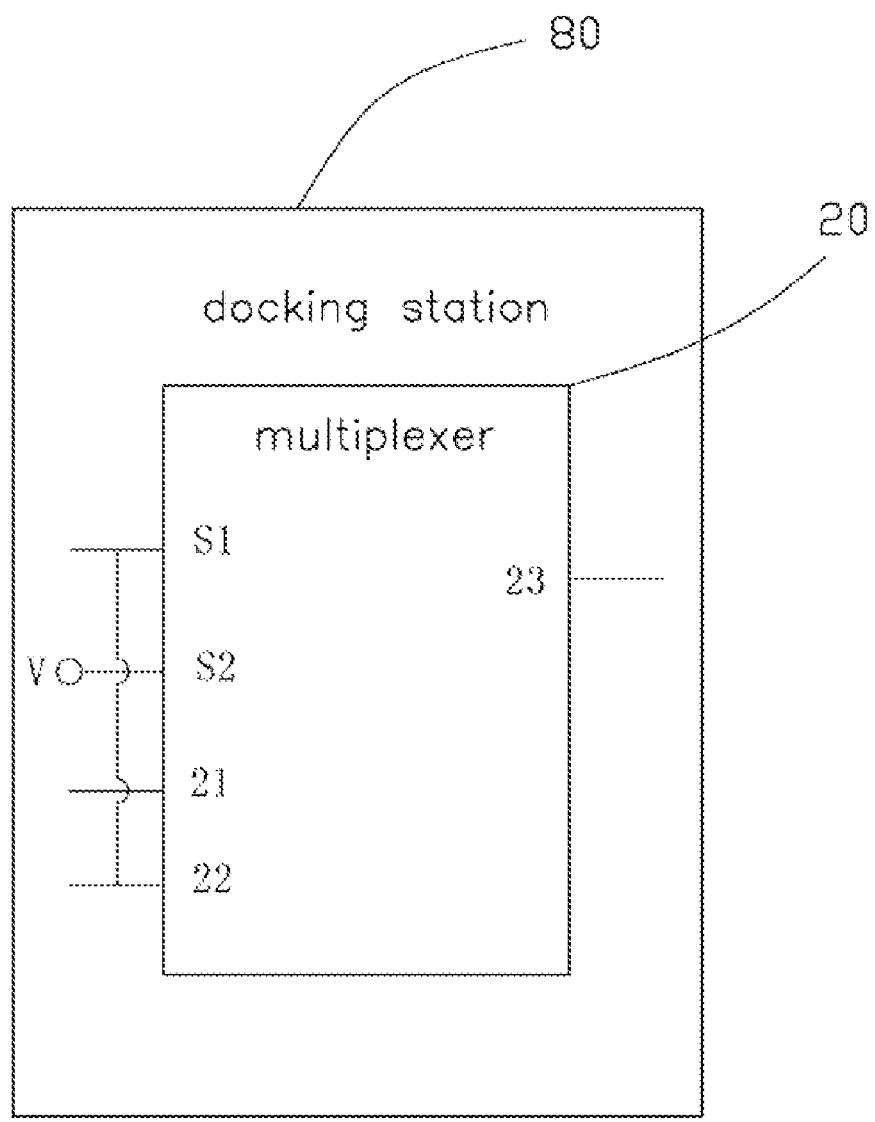
FIG. 1 is a block diagram of an embodiment of a docking station.

Referring to FIG. 1, a docking station 80 in accordance with an embodiment includes a multiplexer 20.

The multiplexer 20 includes a first input end 21, a second input end 22, an output end 23, a first encode end 51, and a second encode end S2. The first encode end 51 is connected to the second input end 22 for monitoring if the second input end 22 is connected to any peripheral device. When there is a peripheral device connected to the second input end 22, a voltage level at the first encode end S1 is high. When there is not a peripheral device connected to the second input end 22, a voltage level at the first encode end S1 is low. The second encode end S2 is connected to a voltage V, so a voltage level at the second encode end S2 is set high.

The voltage levels on the first encode end Si and the second encode end S2 compose a coding. The voltage level on the first encode end S1 is a first bit of the coding, and the voltage level on the second encode end S2 is a second bit of the coding. Therefore, when there is a peripheral device connected to the second input end 22, the coding is "11", and when there is not a peripheral device connected to the second input end 22, the coding is "01".

In one embodiment, the multiplexer 20 is set to give priority to the second input end 22 over the first input end 21. In other words, when there is a peripheral device connected to the second input end 22, the multiplexer 20 only accepts signals from the second input end 22 even if there is a peripheral device connected to the first input end 21. When the multiplexer 20 detects the coding "11", the multiplexer 20 turns off the first input end 21, and turns on the second input end 22. When the multiplexer 20 detects the coding "01", the multiplexer 20 turns on the first input end 21, and turns off the second input end 22.

Figure 2:
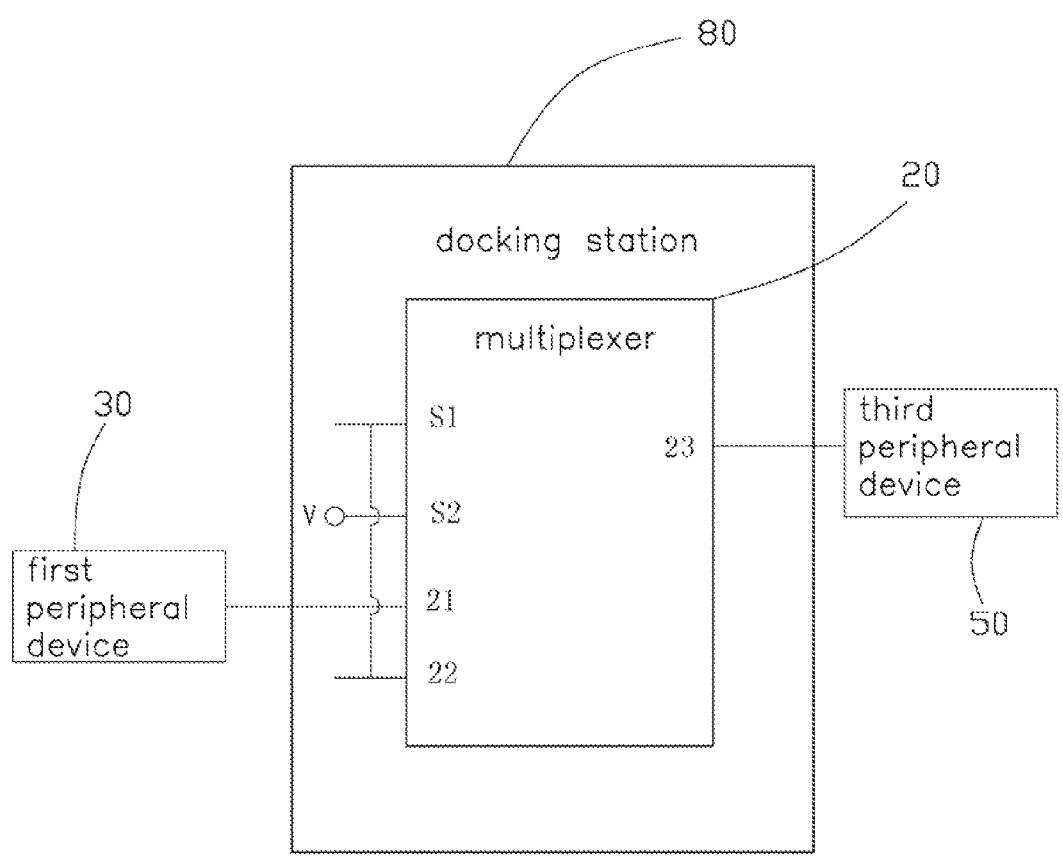
FIG. 2 is a block diagram of the docking station of FIG. 1 connected to a first peripheral device and a third peripheral device.

FIG. 2 shows a first peripheral device 30 connected to the first input end 21, and a third peripheral device 50 connected to the output end 23 of the multiplexer 20. The multiplexer 20 then detects the coding "01". The first input end 21 is turned on, and the second input end 22 is turned off. Therefore, signals output by the first peripheral device 30 are transmitted to the third peripheral device 50 via the first input end 21 and the output end 23. In one embodiment, the first peripheral device 30 is a portable computer, and the third peripheral device 50 is a monitor.

Figure 3:
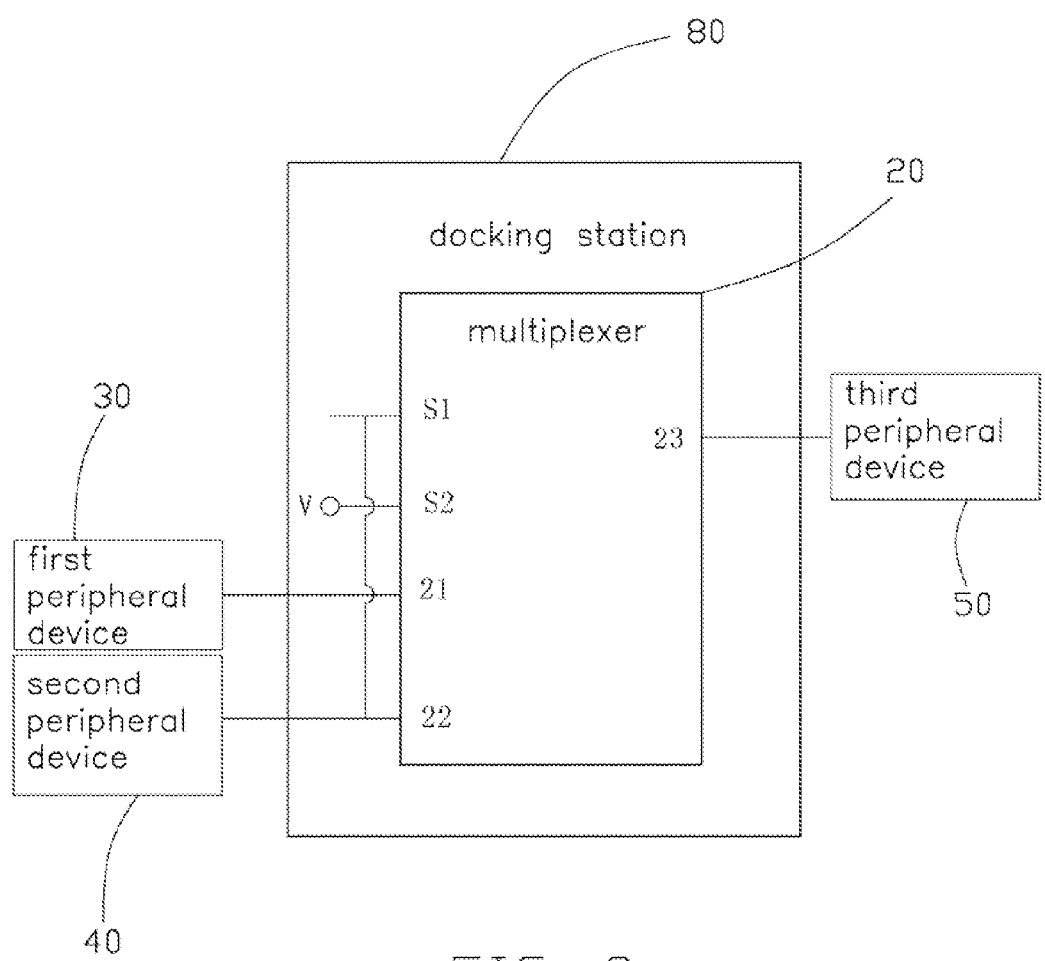
FIG. 3 is block diagram of the docking station of FIG. 1 connected to the first peripheral device, a second peripheral device, and the third peripheral device.

Referring to FIG. 3, FIG. 3 shows the first peripheral device 30 connected to the first input end 21, the third peripheral device 50 connected to the output end 23, and a second peripheral device 40 connected to the second input end 22. The multiplexer 20 then detects the coding "11". The first input end 21 is turned off, and the second input end 22 is turned on. Therefore, signals output by the second peripheral device 40 are transmitted to the third peripheral device 50 via the second input end 22 and the output end 23. In one embodiment, the second peripheral device 40 is a DVD player.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed. It is also to be understood that the above description and the claims drawn to a method may include some indication in reference to certain steps. However, the indication used is only to be viewed for identification purposes and not as a suggestion as to an order for the steps.

What is claimed is:

1. A docking station, comprising:
a multiplexer, the multiplexer comprising a first input end, a second input end, and an encode system; the encode system is connected to the second input end and configured to generate an encoding according to a connection status of the second input end;
wherein the encode system is configured to generate a first encoding, when a first peripheral device is connected to the second input end, to switch the multiplexer to a first state, in which the second input end is on and the first input end is off; and the encode system is configured to generate a second encoding, when the first peripheral device is not connected to the second input end, to switch the multiplexer to a second state, in which the second input end is off and the first input end is on; the encode system comprises a first encode end which is connected to the second input end, a voltage level on the first encode end is configured to be set to be higher when the first peripheral device is connected to the second input end than the voltage level on the first encode end when the first peripheral device is not connected to the second input end.

2. The docking station of claim 1, wherein the encode system further comprises a second encode end which is connected to a high level voltage.

3. The docking station of claim 1, wherein the multiplexer further comprises an output end, the output end is configured to communicate with the first input end when the first input end is on, and the output end is configured to communicate with the second input end when the second input end is on.

4. A docking station, comprising:
a multiplexer comprising a plurality of input ends and an output end; and
an encode system, connected to the multiplexer, configured to generating an encoding, corresponding to a connection status of the plurality of input ends; wherein the multiplexer is configured to connect the output end to one of the plurality of input ends according to the encoding; the plurality of input ends comprises a first input end and a second input end, the encode system is configured to generate a first encoding, when a first peripheral device is connected to the second input end, to switch the multiplexer to a first state, in which the second input end is connected to the output end and the first input end is off; the encode system is further configured to generate a second encoding, when the first peripheral device is not connected to the second input end, to switch the multiplexer to a second state, in which the first input end is connected to the output end and the second end is off.

5. The docking station of claim 4, wherein the encode system comprises a first encode end which is connected to the second input end.

6. The docking station of claim 5, wherein the encode system further comprises a second encode end which is connected to a high level voltage.

7. The docking station of claim 5, wherein a voltage level on the first encode end is configured to be set to be higher when the first peripheral device is connected to the second input end than the voltage level on the first encode end when the first peripheral device is not connected to the second input end.

* * * * *